Nov. 25, 1952    J. H. HITCHCOCK ET AL    2,618,970
DETERMINATION OF STRESSES IN LONGITUDINALLY TRAVELING BODIES
Filed Sept. 11, 1948
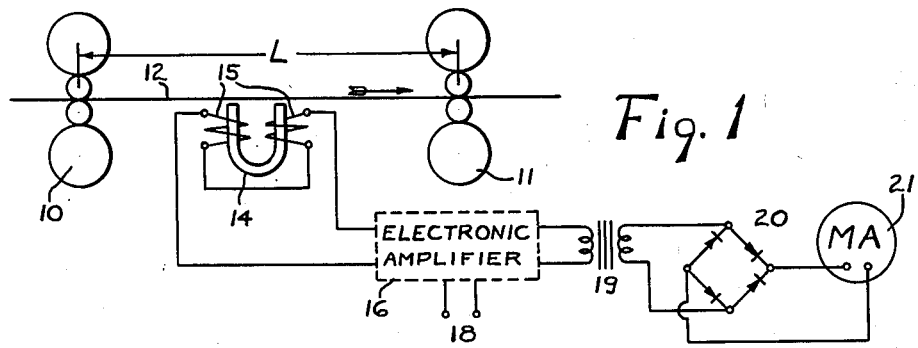
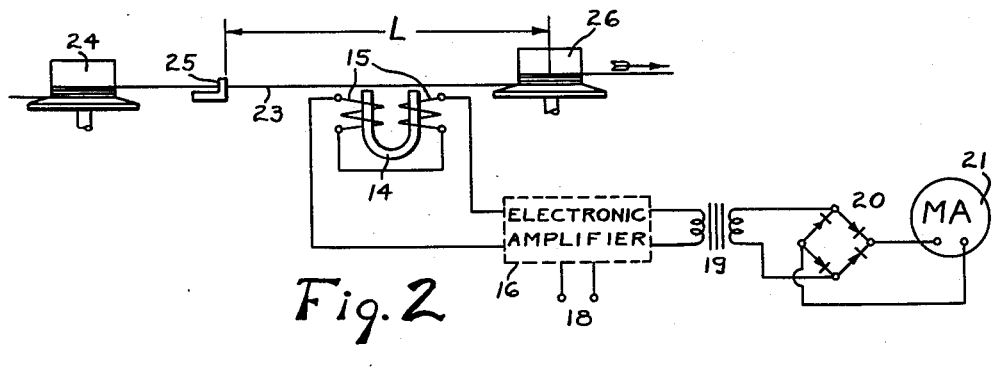
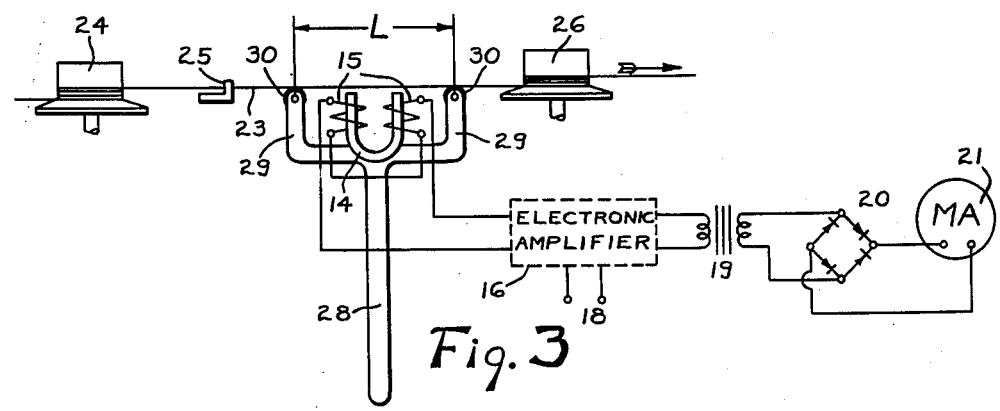
INVENTORS
JOHN H. HITCHCOCK
WILLIAM H. CHAPMAN, DEC'D.
ANNA S. CHAPMAN, ADM'R.
BY Albert G. Blodgett
ATTORNEY Patented Nov. 25, 1952

2,618,970

UNITED STATES PATENT OFFICE 2,618,970

DETERMINATION OF STRESSES IN LONGITUDINALLY TRAVELING BODIES

John H. Hitchcock, Worcester, Mass., and William H. Chapman, deceased, late of Worcester, Mass., by Anna S. Chapman, administratrix, Worcester, Mass., assignors to Morgan Construction Company, Worcester, Mass., a corporation of Massachusetts Application September 11, 1948, Serial No. 48,888

3 Claims. (Cl. 73—143)

This invention relates to the determination of stresses, and more particularly to an apparatus for ascertaining the tensile stress in an elongated body of material while the body is traveling in a longitudinal direction.

In various arts which involve moving an elongated body longitudinally while subjecting it to treatment of one type or another, it is often necessary or highly desirable for the operator to know with reasonable accuracy what tension exists in the body. This problem arises for example in the drawing of metal wire and in the rolling of metal strip. While apparatus has been heretofore employed in some instances for determining the tension in such bodies, the prior apparatus has in general required appreciable deflection of the body from its normal course of travel, which is often undesirable. Furthermore, prior tension measuring apparatus employed for this purpose has been exceedingly cumbersome and expensive.

It is accordingly one object of the invention to provide an improved apparatus of a relatively simple and inexpensive nature for ascertaining the tensile stress in a longitudinally traveling body.

It is a further object of the invention to provide an improved apparatus particularly adapted for determining the tensile stress in an elongated body of ferrous metal while the body is moving longitudinally through a machine which is operating upon the said body, as for example a strip rolling machine or wire-drawing machine.

With these and other objects in view, as will be apparent to those skilled in the art, the invention resides in the combination of parts set forth in the specification and covered by the claims appended hereto.

In accordance with the invention, lateral support is provided for the longitudinally traveling body at two spaced fixed points, and the portion of the body between these points is caused to vibrate at its natural frequency. A unidirectional magnetic field is provided adjacent the vibrating portion of the body, and the vibrations of the body within this field are utilized to generate an alternating electric current. As will be hereinafter explained, the frequency of this current is directly proportional to the square root of the unit tensile stress in the body. Hence the stress may be readily determined by ascertaining the frequency. For this purpose the current is preferably amplified and the amplified current is led through the primary winding of a saturating-core transformer. The current from the secondary winding of the transformer is then led through an ammeter, and the reading of the ammeter is a measure of the frequency as well as of the stress. Preferably the current from the secondary winding is rectified so that a direct current ammeter, with a linear scale, may be employed.

Referring to the drawings illustrating one embodiment of the invention and in which like reference numerals indicate like parts;

Fig. 1 is a diagrammatic view of the invention as applied to metal strip traveling through a rolling mill;

Fig. 2 is a diagrammatic view of the invention as applied to metal wire traveling through a wire-drawing machine; and Fig. 3 is a view similar to Fig. 2 but showing a slight modification of the invention.

The embodiment illustrated in Fig. 1 comprises a pair of four-high roll stands 10 and 11 spaced from one another, with a long steel strip 12 traveling through the roll stands successively. The thickness of the strip will be somewhat reduced in each roll stand, but the portion of the strip between the roll stands will be of uniform cross section throughout its length. In the operation of the rolling mill, the rotating rolls will cause the strip between the roll stands to vibrate, at least slightly, at its natural frequency of fundamental vibration. In experiments made in connection with the development of the invention, it has been found that the natural frequency will be the same for a rapidly moving body as for a stationary body, at least within the limits of experimental error, provided the tension and other factors are the same.

It has been recognized heretofore that the natural frequency of vibration of a stationary body is definitely related to the tension applied to the body, in accordance with the following Formula A:

(A) $$f = \frac{1}{2L}\sqrt{\frac{T}{m}}$$

in which $f$ = frequency
$L$ = length between supports
$T$ = tension, and
$m$ = mass per unit length.

(B) Since $m = \dfrac{w}{g}$ in which $w$ = weight per unit length, and
$g$ = acceleration due to gravity, we have by substitution in Formula A (C) $$f = \frac{1}{2L}\sqrt{\frac{Tg}{w}}$$

If $t$ = the unit tensile stress,
$d$ = the weight per unit volume and
$a$ = the cross sectional area,
$T = ta$ and $w = da$ Hence, by substitution in Formula C we have (D) $$f = \frac{1}{2L}\sqrt{\frac{tg}{d}}$$

from which we obtain (E) $$t = \frac{4df^2L^2}{g}$$

Since $g = 386.4$ inches/sec.$^2$, and for steel $d = .2835$ pound/cubic inch, we have as a formula for the unit tensile stress in a steel strip or wire (F) $$t = \frac{f^2L^2}{341}$$

in which $t$ is expressed in pounds per square inch, $f$ is expressed in vibrations per second, and $L$ is expressed in inches. It will be noted that the unit tensile stress varies as the square of the frequency and also as the square of the length between supports.

Referring now to Fig. 1, it will be seen that a magnet 14 is located close to one of the flat surfaces of the strip 12, approximately equidistant from the roll stands 10 and 11. This is preferably a permanent horseshoe magnet. Each pole of the magnet is surrounded by a coil 15, these coils being connected to one another and to an electronic amplifier 16 which is supplied with electric power from a suitable source 18. The output terminals of the amplifier are connected to the primary winding of a saturating-core transformer 19. The secondary winding of this transformer is connected through a bridge rectifier 20 to a direct current milliammeter 21. This milliammeter may be of either the indicating type or the recording type.

In the operation of the invention the strip 12 will travel longitudinally through the roll stands 10 and 11, and the unsupported portion of the strip will vibrate at its natural frequency of fundamental vibration. This vibration will be brought about by the slight vibration inherent in any rotating machinery, such as the rolls and their driving mechanism, and transmitted to the strip by the rolls. The frequency of the strip vibration will be a function of the unit tensile stress in the steel and the length L between supports, as set forth in Formula F. As the steel strip vibrates in the unidirectional field of the magnet 14, an alternating electric current will be generated in the coils 15, the frequency of this current being equal to the frequency of the strip vibration. This current will be amplified and transmitted to the primary winding of the transformer 19, by means of the amplifier 16, at a voltage sufficient to saturate the transformer core. This will produce an alternating current in the secondary winding of the transformer having a rate of flow or amperage which is a function of the frequency of the primary current and independent of the amperage of the primary current. This secondary current is rectified by the bridge rectifier 20 and measured by the milliammeter 21. For general use this milliammeter may be calibrated to read in frequency, and the unit tensile stress may be determined from the frequency and the length L between supports, by means of the Formula F. If the apparatus is to be used under circumstances such that the length L will always be the same, the milliammeter may be calibrated to read directly in unit stress. In calibrating the instrument, an electronic oscillator of well-known type may be employed to supply current at several different known frequencies to the input of the amplifier 16. An alternate method of calibration includes the use of an oscillograph or an oscilloscope connected to the output of the amplifier 16 to determine the frequency of the electric current, currents of various frequencies being supplied to the input of the amplifier by any suitable means.

In Fig. 2 the invention is shown employed for determining the tensile stress in a steel wire 23 traveling through a wire-drawing machine, only a portion of the machine being shown. After passing several times around a rotating drum 24, the wire travels through a reducing die 25 and thence to a second rotating drum 26, around which the wire passes several times. To determine the stress in the portion of wire between the die 25 and the drum 26, which has a uniform cross section and an unsupported length L between the die and the point of wire tangency on the drum, the magnet 14 will be supported with its poles close to the wire at approximately the mid-point of the length L. Vibration will be transmitted to the wire through the block 26 and the die 25, and the wire will vibrate at its natural frequency of fundamental vibration. This will generate an alternating electric current in the coils 15, and this current will be amplified and transmitted to the primary winding of the transformer 19, as explained in connection with Fig. 1, at a sufficient voltage to maintain saturation of the transformer core. From the reading of the milliammeter 21 the unit tensile stress in the wire may be determined.

In Fig. 3 the invention is shown in use in connection with wire-drawing, as in Fig. 2, but the magnet 14 is shown mounted on a suitable handle 28 having two branches or horns 29 located on opposite sides of the magnet. On the end of each branch 29 there is mounted a small idler sheave 30. These sheaves are adapted to engage the wire with a light pressure, thus locating the poles of the magnet close to but slightly spaced from the wire. With this apparatus, the length L of the wire between supports will be equal to the distance between the centers of the two sheaves 30. Since this is a fixed distance, the milliammeter can be calibrated to read direcly in unit tensile stress, and the apparatus may be used with different wire-drawing machines or with different stages of the same wire-drawing machine without recalibration.

It will be apparent that the invention provides a comparatively simple, inexpensive and accurate apparatus for determining tensile stress in a longitudinally moving body without deflecting the body laterally from its normal course of travel. Obviously the invention may be employed in various types of machines which cause longitudinal travel of bodies under tension, and it is not limited to use in the wire-drawing or strip-rolling arts.

Having thus described the invention, what we claim as new and desire to secure by Letters Patent is:

1. Apparatus for determining the unit tensile stress in an elongated body of ferrous material traveling longitudinally comprising a portable device having means thereon adapted to support the body laterally at two spaced fixed points while leaving the portion of the body between said points free to vibrate at its natural frequency, a magnet mounted on the device and adapted to provide a unidirectional magnetic field adjacent to the vibrating portion of the body, an electrical conductor positioned adjacent to the magnet so that vibrations of the body will generate in the conductor an alternating electric current having a frequency which is directly proportional to the square root of the tensile stress in the body, and indicating means responsive to variations in the said electric current frequency.

2. Apparatus as set forth in claim 1, in which the portable device includes a handle by which the device may be held in operative position, and a pair of spaced idler rollers for lateral support of the traveling body.

3. Apparatus for determining the unit tensile stress in an elongated body of ferrous material traveling longitudinally comprising a device having means thereon adapted to support the body laterally at two spaced fixed points while leaving the portion of the body between said points free to vibrate at its natural frequency, a magnet mounted on the device and adapted to provide a unidirectional magnetic field adjacent to the vibrating portion of the body, an electrical conductor positioned adjacent to the magnet so that vibrations of the body will generate in the conductor an alternating electric current having a frequency which is directly proportional to the square root of the tensile stress in the body, and indicating means responsive to variations in the said electric current frequency.

JOHN H. HITCHCOCK.
ANNA S. CHAPMAN,
*Administratrix of the Estate of William H. Chapman, Deceased.*

REFERENCES CITED

The following references are of record in the file of this patent:

UNITED STATES PATENTS

| Number | Name | Date |
| --- | --- | --- |
| 1,635,787 | Hort | July 12, 1927 |
| 2,058,302 | Faus et al. | Oct. 20, 1936 |
| 2,265,011 | Siegel | Dec. 2, 1941 |
| 2,278,510 | Condon | Apr. 7, 1942 |
| 2,306,137 | Pabst et al. | Dec. 22, 1942 |
| 2,394,455 | Koch | Feb. 5, 1946 |

FOREIGN PATENTS

| Number | Country | Date |
| --- | --- | --- |
| 723,026 | Germany | July 27, 1942 |